(12) United States Patent
Englehart et al.

(10) Patent No.: US 10,677,070 B2
(45) Date of Patent: Jun. 9, 2020

(54) BLADE PLATFORM GUSSET WITH INTERNAL COOLING

(71) Applicant: United Technologies Corporation, Farmington, CT (US)

(72) Inventors: Joseph F. Englehart, Gastonia, NC (US); Edward F. Pietraszkiewicz, Southington, CT (US); Wieslaw A. Chlus, Wethersfield, CT (US); David M. Konopka, Stuart, FL (US); Luke A. Hmiel, Tequesta, FL (US); Kenneth Boucher, Branford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 617 days.

(21) Appl. No.: 14/886,201

(22) Filed: Oct. 19, 2015

(65) Prior Publication Data

US 2017/0107830 A1    Apr. 20, 2017

(51) Int. Cl.
*F02C 1/00* (2006.01)
*F01D 5/18* (2006.01)
(Continued)

(52) U.S. Cl.
CPC ............ *F01D 5/187* (2013.01); *F01D 5/147* (2013.01); *F02C 3/04* (2013.01); *F02C 7/18* (2013.01);
(Continued)

(58) Field of Classification Search
CPC ............ F01D 5/18; F01D 5/187; F01D 5/147
See application file for complete search history.

(56) References Cited

U.S. PATENT DOCUMENTS 6,158,962 A * 12/2000 Lee .................... B63H 1/20
                                                    416/193 A
7,416,391 B2 * 8/2008 Veltre ................ F01D 5/187
                                                    416/193 A
(Continued)

FOREIGN PATENT DOCUMENTS

EP          2037081 A1      3/2009
EP          2228518 A2      9/2010

OTHER PUBLICATIONS

European Search Report Issued in EP Application No. 16194110.9, dated Feb. 17, 2017, 7 Pages.

*Primary Examiner* — Gerald L Sung
(74) *Attorney, Agent, or Firm* — Cantor Colburn LLP

(57) ABSTRACT

A blade assembly includes a blade and a blade platform secured to the blade. The blade extends radially from the blade platform. The blade platform includes at least one platform airflow passage located therein. A gusset extends from the blade to the blade platform. The gusset includes a gusset airflow passage fluidly connected to the platform airflow passage to convey an airflow to the platform airflow passage. a gas turbine engine includes a combustor and a plurality of gas turbine engine components located in fluid communication with the combustor. The gas turbine engine component includes an airfoil portion and a platform secured to the airfoil portion. The platform includes at least one platform airflow passage positioned therein. A gusset extends from the airfoil portion to the platform. The gusset includes a gusset airflow passage fluidly connected to the platform airflow passage to convey an airflow to the platform airflow passage.

20 Claims, 4 Drawing Sheets

(51) Int. Cl.
*F01D 5/14* (2006.01)
*F02C 3/04* (2006.01)
*F02C 7/18* (2006.01)

(52) U.S. Cl.
CPC ...... *F05D 2220/32* (2013.01); *F05D 2240/24* (2013.01); *F05D 2240/35* (2013.01); *F05D 2240/81* (2013.01); *F05D 2260/20* (2013.01)

(56) References Cited

U.S. PATENT DOCUMENTS

| | | | |
|---|---|---|---|
| 2006/0093484 A1 | 5/2006 | Liang | |
| 2007/0020100 A1* | 1/2007 | Beeck | F01D 5/147 416/193 A |
| 2007/0177976 A1* | 8/2007 | Cunha | B22C 9/04 416/97 R |
| 2009/0202339 A1* | 8/2009 | Torii | F01D 5/18 415/115 |
| 2010/0232975 A1* | 9/2010 | Morris | F01D 5/187 416/232 |
| 2012/0328451 A1* | 12/2012 | Lomas | F01D 5/187 416/97 R |
| 2013/0004331 A1* | 1/2013 | Beeck | F01D 5/143 416/97 R |

* cited by examiner

BLADE PLATFORM GUSSET WITH INTERNAL COOLING

BACKGROUND

This disclosure relates to gas turbine engines, and more particularly to thermal management of turbine components of gas turbine engines.

Gas turbines hot section components, in particular turbine vanes and blades in the turbine section of the gas turbine are configured for use within particular temperature ranges. Such components often rely on cooling airflow to maintain turbine components within this particular temperature range. For example, stationary turbine vanes often have internal passages for cooling airflow to flow through, and additionally may have openings in an outer surface of the vane for cooling airflow to exit the interior of the vane structure and form a cooling film of air over the outer surface to provide the necessary thermal conditioning. Other components of the turbine often also require such thermal conditioning to reduce thermal gradients that would otherwise be present in the structure and which are generally undesirable. Thus, ways to increase thermal conditioning capability in the turbine are desired.

SUMMARY

In one embodiment, a blade assembly for a gas turbine engine includes a blade and a blade platform secured to the blade. The blade extends radially outwardly from the blade platform. The blade platform includes at least one platform airflow passage located therein. A gusset extends from the blade to the blade platform. The gusset includes a gusset airflow passage fluidly connected to the platform airflow passage to convey an airflow to the platform airflow passage.

Additionally or alternatively, in this or other embodiments a blade airflow passage is positioned at the blade, the gusset airflow passage connecting the blade airflow passage to the platform airflow passage.

Additionally or alternatively, in this or other embodiments the platform airflow passage is configured to convey the airflow toward a leading edge of the blade platform from a platform airflow passage entrance.

Additionally or alternatively, in this or other embodiments the gusset is located at about midchord of the blade.

Additionally or alternatively, in this or other embodiments the gusset is located at a pressure side of the blade.

Additionally or alternatively, in this or other embodiments the gusset airflow passage is formed integral with the platform airflow passage.

Additionally or alternatively, in this or other embodiments the gusset airflow passage is formed by casting.

In another embodiment, a rotor assembly for a gas turbine engine includes a rotor disc and a plurality of rotor blades extending radially outwardly from the rotor disc. Each rotor blade includes a blade and a blade platform secured to the blade. The blade extends radially outwardly from the blade platform. The blade platform includes at least one platform airflow passage located therein. A gusset extends from the blade to the blade platform. The gusset includes a gusset airflow passage fluidly connected to the platform airflow passage to convey an airflow to the platform airflow passage.

Additionally or alternatively, in this or other embodiments a blade airflow passage is located at the blade. The gusset airflow passage connects the blade airflow passage to the platform airflow passage.

Additionally or alternatively, in this or other embodiments the platform airflow passage is configured to convey the airflow toward a leading edge of the blade platform from a platform airflow passage entrance.

Additionally or alternatively, in this or other embodiments the gusset is located at about midchord of the blade.

Additionally or alternatively, in this or other embodiments the gusset is located at a pressure side of the blade.

Additionally or alternatively, in this or other embodiments the gusset airflow passage is formed integral with the platform airflow passage.

Additionally or alternatively, in this or other embodiments the rotor assembly is a turbine rotor assembly.

In yet another embodiment, a gas turbine engine includes a combustor and a plurality of gas turbine engine components located in fluid communication with the combustor. The gas turbine engine component includes an airfoil portion and a platform secured to the airfoil portion. The platform includes at least one platform airflow passage positioned therein. A gusset extends from the airfoil portion to the platform. The gusset includes a gusset airflow passage fluidly connected to the platform airflow passage to convey an airflow to the platform airflow passage.

Additionally or alternatively, in this or other embodiments an airflow passage is located at the airfoil portion, the gusset airflow passage connecting the airfoil portion airflow passage to the platform airflow passage.

Additionally or alternatively, in this or other embodiments the platform airflow passage is configured to convey the airflow toward a leading edge of the platform from a platform airflow passage entrance.

Additionally or alternatively, in this or other embodiments the gusset is located at about midchord of the airfoil portion.

Additionally or alternatively, in this or other embodiments the gusset is located at a pressure side of the airfoil portion.

Additionally or alternatively, in this or other embodiments the gusset airflow passage is formed integral with the platform airflow passage.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
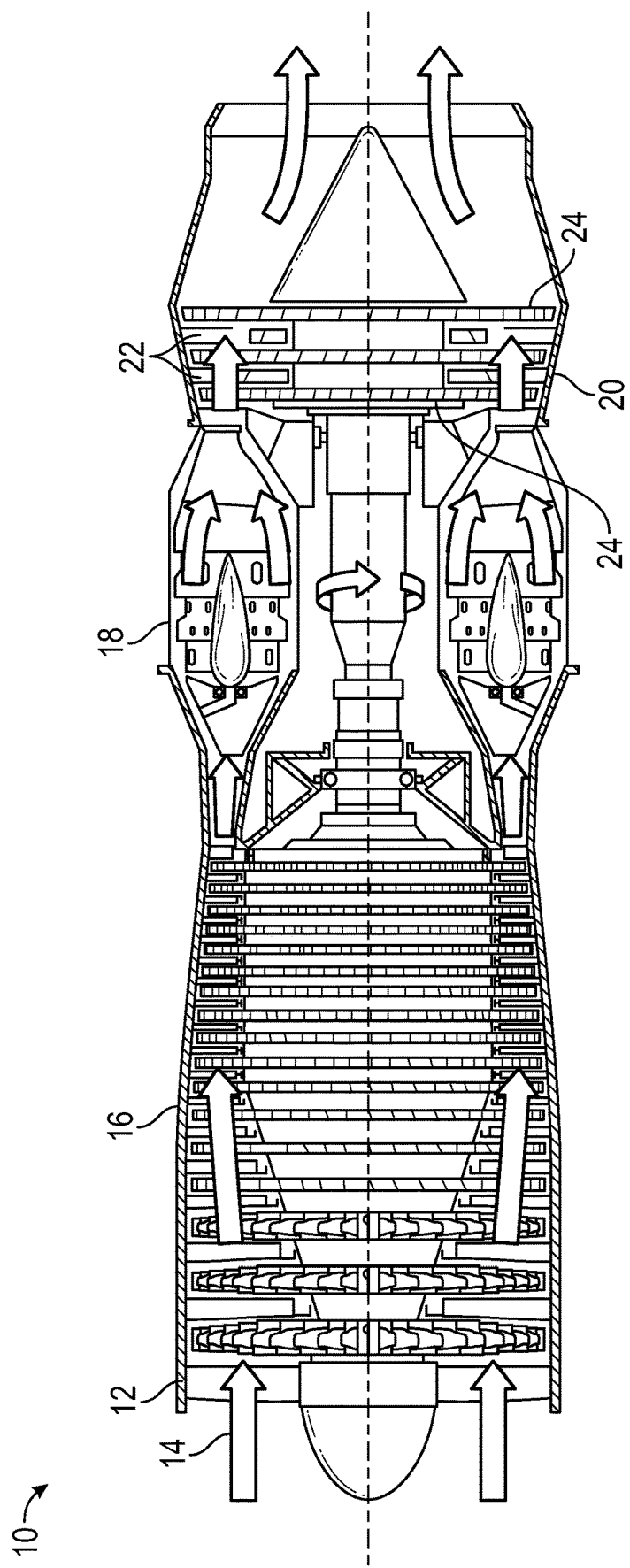
FIG. 1 is a schematic illustration of a gas turbine engine.

FIG. 1 is a schematic illustration of a gas turbine engine 10. The gas turbine engine generally has a fan 12 through which ambient air is propelled in the direction of arrow 14, a compressor 16 for pressurizing the air received from the fan 12 and a combustor 18 wherein the compressed air is mixed with fuel and ignited for generating combustion gases.

The gas turbine engine 10 further comprises a turbine section 20 for extracting energy from the combustion gases. Fuel is injected into the combustor 18 of the gas turbine engine 10 for mixing with the compressed air from the compressor 16 and ignition of the resultant mixture. The fan 12, compressor 16, combustor 18, and turbine 20 are typically all concentric about a common central longitudinal axis of the gas turbine engine 10.

The gas turbine engine 10 may further comprise a low pressure compressor located upstream of a high pressure compressor and a high pressure turbine located upstream of a low pressure turbine. For example, the compressor 16 may be a multi-stage compressor 16 that has a low-pressure compressor and a high-pressure compressor and the turbine 20 may be a multistage turbine 20 that has a high-pressure turbine and a low-pressure turbine. In one embodiment, the low-pressure compressor is connected to the low-pressure turbine and the high pressure compressor is connected to the high-pressure turbine.

Figure 2:
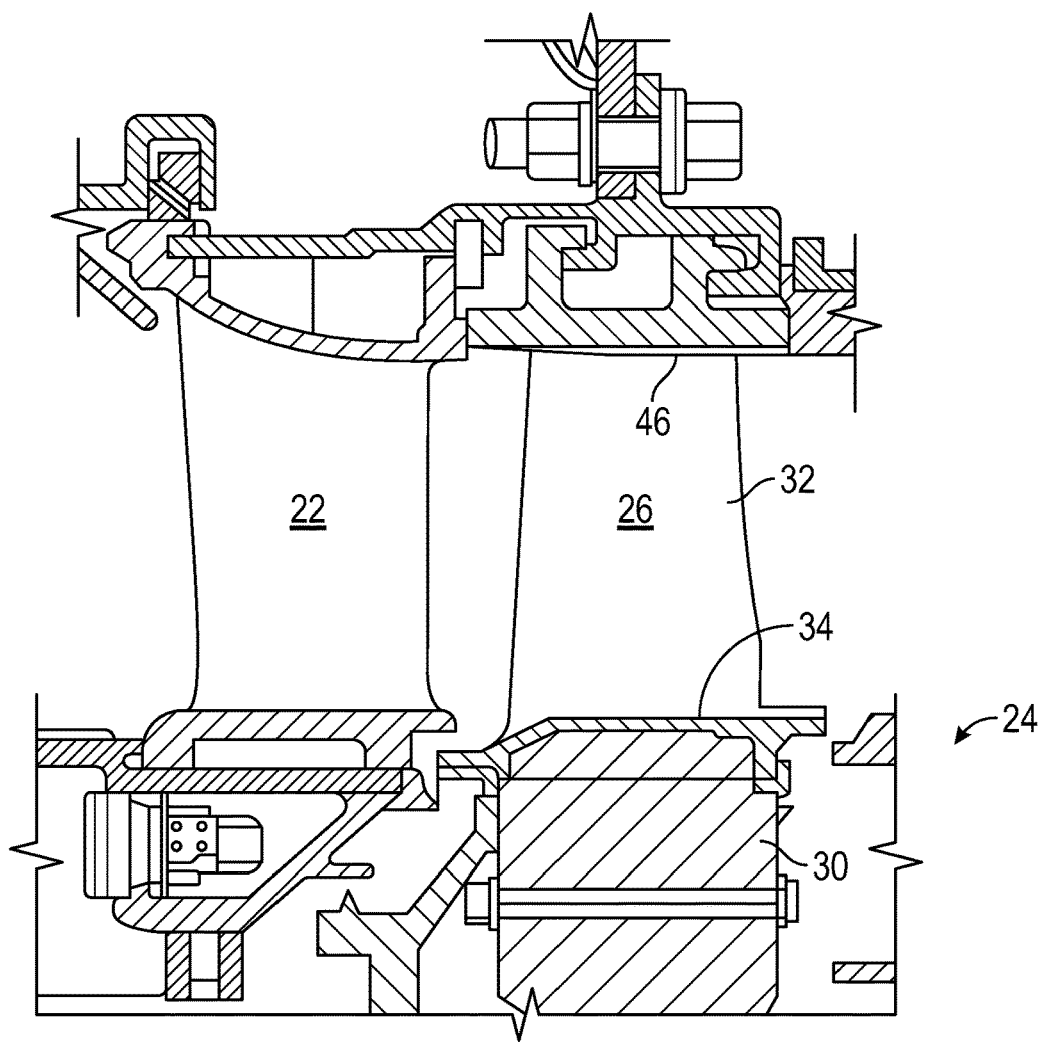
FIG. 2 is a schematic illustration of an embodiment of a turbine rotor assembly.

The turbine 20 includes one or more sets, or stages, of fixed turbine vanes 22 and turbine rotors 24, each turbine rotor 24 including a plurality of turbine blades 26 (shown in FIG. 2). The turbine vanes 22 and the turbine blades 26 utilize a cooling airflow to maintain the turbine components within a desired temperature range. In some embodiments, the cooling airflow may flow internal through the turbine components to cool the components internally, while in other embodiments, the cooling airflow is utilized to form a cooling film on exterior surfaces of the components.

Figure 3:
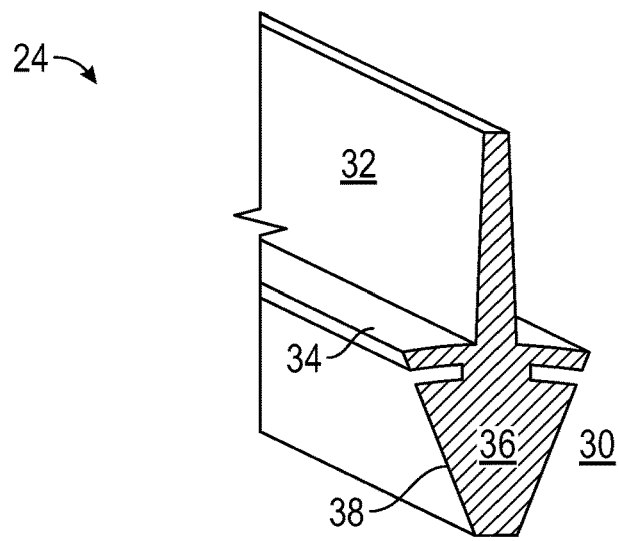
FIG. 3 is another illustration of an embodiment of a turbine rotor assembly.

FIG. 2 illustrates an example of a turbine rotor 24 structure in more detail. While the present description regards a turbine rotor 24 and turbine blades 26, it is to be appreciated that the present disclosure may be readily adapted to turbine vanes 22 and compressor 16 components. The turbine rotor 24 includes a turbine disc 28 having a disc rim 30 to which a plurality of radially-extending turbine blades 26 are mounted. Each turbine blade 26 includes an airfoil portion 32 extending from a blade platform 34. As shown in FIG. 3, a blade root 36 extends radially inboard of the blade platform 34 and is inserted into a complimentary slot 38 or other opening in the disc rim 30 to mount the turbine blade 26 to the turbine disc 28. The turbine blade 26 may be anchored in place in the turbine disc 28 by bolts, rivets, or other mechanical fastening arrangements.

Figure 4:
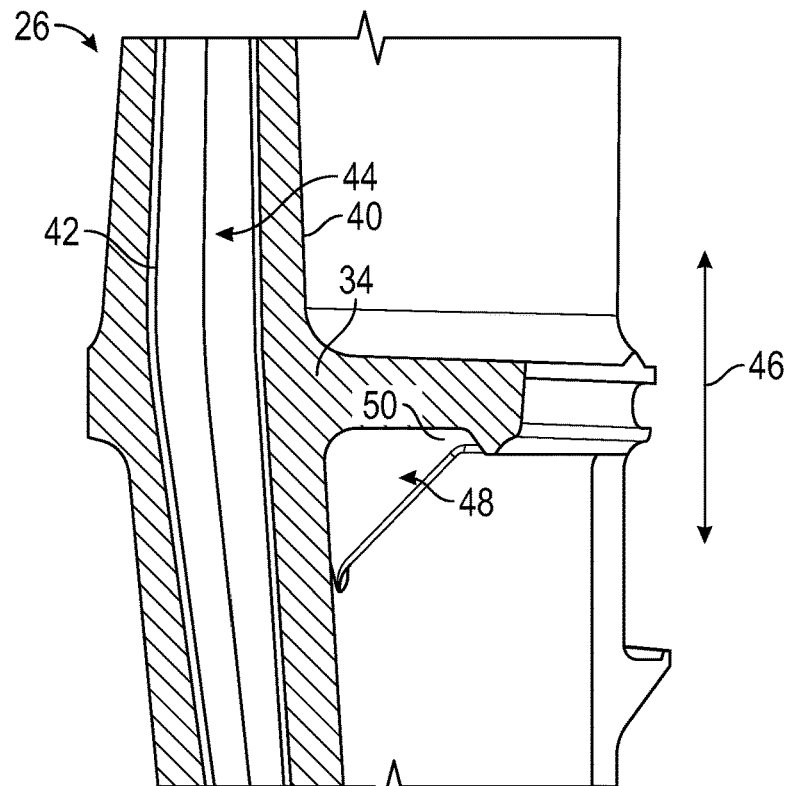
FIG. 4 is a cross-sectional view of an embodiment of a turbine blade.

Referring now to FIG. 4, shown is a cross-sectional view of a turbine blade 26. The turbine blade 26 includes a pressure side 40 and a suction side 42, with a blade cavity 44 located between the pressure side 40 and the suction side 42 and extending along a spanwise direction 46 of the turbine blade 26 from the blade platform 34 toward a blade tip (shown in FIG. 2). A gusset 48 extends from the blade platform 34 toward the turbine blade 26, in some embodiments at the pressure side 40 of the turbine blade 26 and at a radially inboard side 50 of the blade platform 34. In some embodiments, the gusset 48 is located at about mid-chord of the turbine blade 26. The gusset 48 supports the blade platform 34 and reacts centrifugal loading on the blade platform 34, and further reduces bending stresses at the blade platform 34. It is to be appreciated that while shown at an approximately mid-chord location, the gusset 48 may be positioned at other selected locations along the turbine blade 26.

Figure 5:
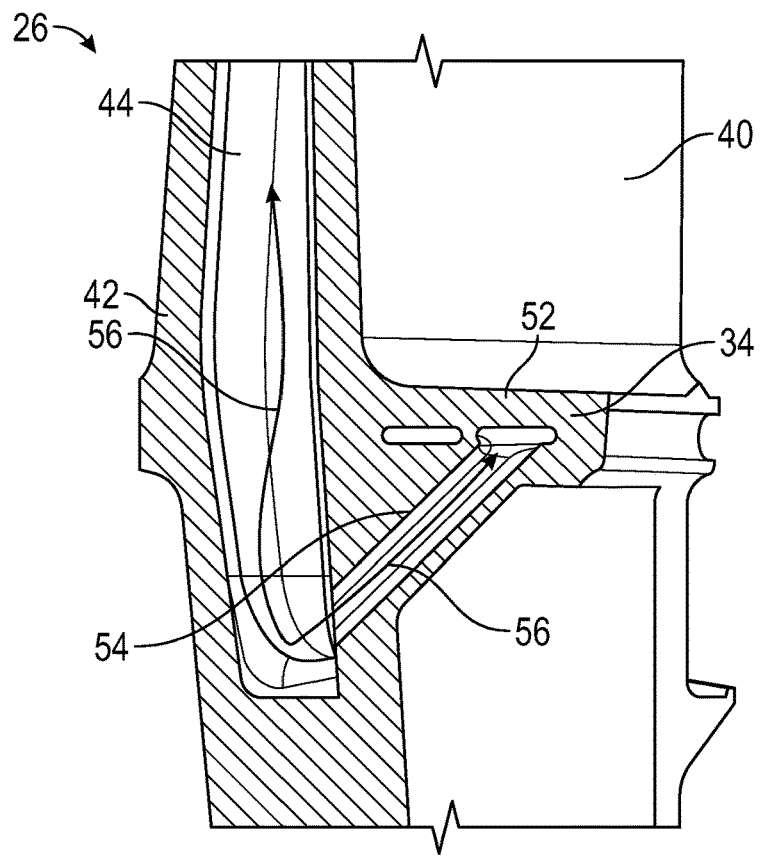
FIG. 5 is another cross-sectional view of an embodiment of a turbine blade.
Figure 6:
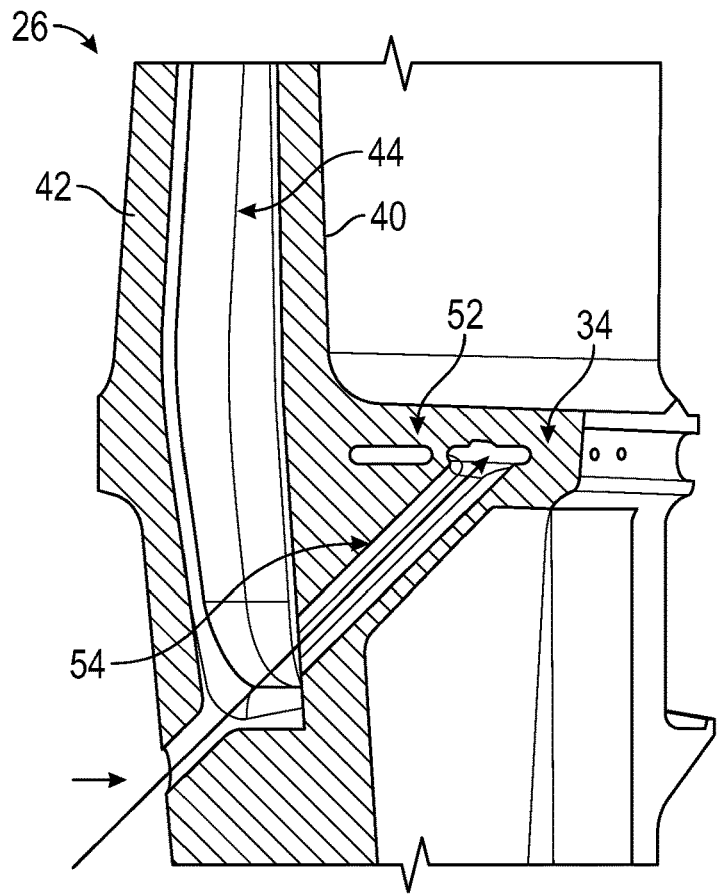
FIG. 6 is a cross-sectional view of another embodiment of a turbine blade.

Referring now to FIG. 5, a cross-sectional view of the turbine blade 26 through the gusset 48 is illustrated. The blade platform 34 includes a platform air passage 52, which is connected to the blade cavity 44 via a gusset air passage 54 extending through the gusset 48. The gusset air passage 54 allows for diversion of a portion of blade cooling airflow 56 from the blade cavity 44 to the platform air passage 52 to cool the blade platform 34 via, in some embodiments, a plurality of platform openings (not shown) in the blade platform forming a cooling film on the platform 34. In the embodiment of FIG. 5, the platform air passage 52 and the gusset air passage 54 may be formed concurrently with the manufacture of the turbine blade 26 by, for example, a casting process. In an alternative embodiment, illustrated in FIG. 6, the gusset air passage 54 is formed in a secondary process after formation of the turbine blade 26. For example, the gusset air passage 54 may be formed by a drilling operation, after which an entry opening 56 at the turbine blade 26 is closed via, for example, welding. It is to be appreciated that while the gusset air passage 54 is described herein as being located at the turbine blade 26, turbine vanes 22 may utilize gusset air passages 54 to cool platforms of turbine vanes 22. Further, while a single gusset 48 and gusset air passage 54 are shown, embodiments of turbine blades 26 or turbine vanes 22 may include two or more gussets 48 and/or two or more gusset air passages 54. In some embodiments, the gusset air passage 54 is circular in cross-section, while in other embodiments, other cross-sectional shapes such as elliptical or oval, may be utilized.

Figure 7:
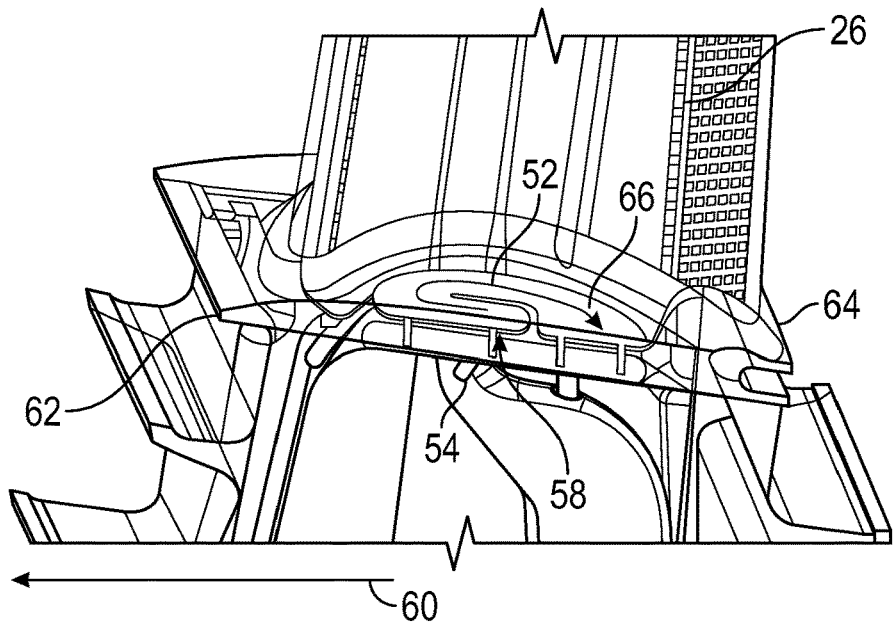
FIG. 7 is a partial perspective view of an embodiment of a turbine blade.

Referring now to FIG. 7, the platform air passage 52 may take one of a variety of shapes. In one embodiment, as shown, the platform air passage 52 is configured to direct the cooling flow 56 into a platform air passage entrance 58 and then in an axially upstream direction 60, relative to a general airflow direction through the turbine section 20 toward a platform leading edge 62. The cooling airflow 56, then flows axially rearwardly toward a platform trailing edge 64 before exiting the platform air passage 52 at a platform air passage exit 66. In some embodiments, the platform air passage 52 has a spiral shape. Directing the cooling airflow 56 forward, then rearwardly, directs the highest pressure cooling airflow 56 at the platform leading edge 62, prior to pressure losses degrading the cooling effectiveness of the airflow as it flows rearwardly. In alternative embodiments, the gusset 48 and gusset air passage 54 may be located at or near a platform leading edge 62, with the cooling airflow 56 directed rearwardly along the platform air passage 52.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A blade assembly for a gas turbine engine, comprising:
   a blade;

a blade platform secured to the blade, the blade extending radially outwardly from the blade platform, the blade platform including at least one platform airflow passage disposed therein; and a gusset extending from the airfoil portion to the platform, the gusset including a gusset airflow passage fluidly connected to the at least one platform airflow passage such that a platform airflow passage inlet is disposed at the gusset airflow passage to convey an airflow to the at least one platform airflow passage, a platform airflow passage of the at least one platform airflow passage configured to direct the airflow in an axially upstream direction from the platform airflow passage inlet toward a platform leading edge along a first passage portion to an upstreammost extent of the platform airflow passage, then axially rearwardly from the upstreammost extent toward a platform trailing edge along a second passage portion before exiting a platform airflow passage of the at least one platform airflow at a platform airflow passage exit, the second passage portion disposed circumferentially closer to the blade than the first passage portion;

wherein the platform airflow passage exit is located downstream from the platform airflow passage inlet.

2. The blade assembly of claim 1, further comprising a blade airflow passage disposed at the blade, the gusset airflow passage connecting the blade airflow passage to the at least one platform airflow passage.

3. The blade assembly of claim 1, wherein the at least one platform airflow passage is configured to convey the airflow toward a leading edge of the blade platform from the platform airflow passage inlet.

4. The blade assembly of claim 1, wherein the gusset is disposed at about midchord of the blade.

5. The blade assembly of claim 1, wherein the gusset is disposed at a pressure side of the blade.

6. The blade assembly of claim 1, wherein the gusset airflow passage is formed integral with the at least one platform airflow passage.

7. The blade assembly of claim 6, wherein the gusset airflow passage is formed by casting.

8. A rotor assembly for a gas turbine engine, comprising:
a rotor disc; and
a plurality of rotor blades extending radially outwardly from the rotor disc, each rotor blade including:
  a blade;
  a blade platform secured to the blade, the blade extending radially outwardly from the blade platform, the blade platform including at least one platform airflow passage disposed therein; and
a gusset extending from the airfoil portion to the platform, the gusset including a gusset airflow passage fluidly connected to the at least one platform airflow passage such that a platform airflow passage inlet is disposed at the gusset airflow passage to convey an airflow to the at least one platform airflow passage, a platform airflow passage of the at least one platform airflow passage configured to direct the airflow in an axially upstream direction from the platform airflow passage inlet toward a platform leading edge along a first passage portion to an upstreammost extent of the platform airflow passage, then axially rearwardly from the upstreammost extent toward a platform trailing edge along a second passage portion before exiting a platform airflow passage of the at least one platform airflow at a platform airflow passage exit, the second passage portion disposed circumferentially closer to the blade than the first passage portion;

wherein the platform airflow passage exit is located downstream from the platform airflow passage inlet.

9. The rotor assembly of claim 8, further comprising a blade airflow passage disposed at the blade, the gusset airflow passage connecting the blade airflow passage to the at least one platform airflow passage.

10. The rotor assembly of claim 8, wherein the at least one platform airflow passage is configured to convey the airflow toward a leading edge of the blade platform from the platform airflow passage inlet.

11. The rotor assembly of claim 8, wherein the gusset is disposed at about midchord of the blade.

12. The rotor assembly of claim 8, wherein the gusset is disposed at a pressure side of the blade.

13. The rotor assembly of claim 8, wherein the gusset airflow passage is formed integral with the at least one platform airflow passage.

14. The rotor assembly of claim 8, wherein rotor assembly is a turbine rotor assembly.

15. A gas turbine engine, comprising:
a combustor; and
a plurality of gas turbine engine components disposed in fluid communication with the combustor, including:
  an airfoil portion;
  a platform secured to the airfoil portion, the platform including at least one platform airflow passage disposed therein; and
  a gusset extending from the airfoil portion to the platform, the gusset including a gusset airflow passage fluidly connected to the at least one platform airflow passage such that a platform airflow passage inlet is disposed at the gusset airflow passage to convey an airflow to the at least one platform airflow passage, a platform airflow passage of the at least one platform airflow passage configured to direct the airflow in an axially upstream direction from the platform airflow passage inlet toward a platform leading edge along a first passage portion to an upstreammost extent of the platform airflow passage, then axially rearwardly from the upstreammost extent toward a platform trailing edge along a second passage portion before exiting a platform airflow passage of the at least one platform airflow at a platform airflow passage exit, the second passage portion disposed circumferentially closer to the blade than the first passage portion;

wherein the platform airflow passage exit is located downstream from the platform airflow passage inlet.

16. The gas turbine engine of claim 15, further comprising a blade airflow passage disposed at the airfoil portion, the gusset airflow passage connecting the airfoil portion airflow passage to the at least one platform airflow passage.

17. The gas turbine engine of claim 15, wherein the at least one platform airflow passage is configured to convey the airflow toward a leading edge of the platform from the platform airflow passage inlet.

18. The gas turbine engine of claim 15, wherein the gusset is disposed at about midchord of the airfoil portion.

19. The gas turbine engine of claim 15, wherein the gusset is disposed at a pressure side of the airfoil portion.

20. The gas turbine engine of claim 15, wherein the gusset airflow passage is formed integral with the at least one platform airflow passage.

* * * * *